United States Patent
Sorrentino

(10) Patent No.: US 9,100,961 B2
(45) Date of Patent: Aug. 4, 2015

(54) METHODS AND DEVICES FOR HANDLING REFERENCE SIGNALS IN A COMMUNICATIONS NETWORK

(75) Inventor: Stefano Sorrentino, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 110 days.

(21) Appl. No.: 13/575,988

(22) PCT Filed: Jun. 28, 2012

(86) PCT No.: PCT/SE2012/050736
§ 371 (c)(1),
(2), (4) Date: Jul. 30, 2012

(87) PCT Pub. No.: WO2013/002724
PCT Pub. Date: Jan. 3, 2013

(65) Prior Publication Data
US 2013/0100926 A1    Apr. 25, 2013

(51) Int. Cl.
| H04B 7/216 | (2006.01) |
| H04J 11/00 | (2006.01) |
| H04W 72/04 | (2009.01) |
| H04L 5/00 | (2006.01) |
| H04L 27/26 | (2006.01) |

(52) U.S. Cl.
CPC ......... *H04W 72/0446* (2013.01); *H04L 5/0035* (2013.01); *H04L 5/0051* (2013.01); *H04L 5/0094* (2013.01); *H04L 27/2613* (2013.01); *H04L 5/0073* (2013.01)

(58) Field of Classification Search
USPC ........... 370/329–335, 208–310; 375/138–224
See application file for complete search history.

(56) References Cited

U.S. PATENT DOCUMENTS

| 8,483,258 B2 * | 7/2013 | Cho et al. ....................... 375/137 |
| 8,503,286 B2 * | 8/2013 | Kwak et al. ................... 370/208 |
| 8,531,939 B2 * | 9/2013 | Yoon et al. .................... 370/203 |
| 8,576,822 B2 * | 11/2013 | Yoon et al. .................... 370/342 |
| 8,611,282 B2 * | 12/2013 | Kim et al. ..................... 370/328 |

(Continued)

FOREIGN PATENT DOCUMENTS

WO    WO 2011/121925 A1    10/2011

OTHER PUBLICATIONS

International Search Report Corresponding to International Application No. PCT/SE2012/050736; Date of Mailing: Nov. 19, 2012; 18 Pages.

Nokia Siemens Networks, Nokia et al., "On DM RS Enhancements for UL CoMP", 3GPP Draft: R1-121282; Jeju, Korea, Mar. 26-30, 2012, 6 Pages.

(Continued)

*Primary Examiner* — Man Phan
(74) *Attorney, Agent, or Firm* — Myers Bigel Sibley & Sajovec, PA

(57) ABSTRACT

Methods in a first user equipment are provided for handling reference signals in a communications network. The user equipment is configured to receive a signal from a base station. The signal comprises a first slot and a second slot. The first slot comprises a first reference signal and the second slot comprises a second reference signal. The user equipment receives, from the base station, information that the first reference signal should be assigned to the second slot and that the second reference signal should be assigned to the first slot. The user equipment assigns the first reference signal to the second slot and the second reference signal to the first slot. The first user equipment processes the first reference signal assigned to the second slot and the second reference signal assigned to the first slot.

17 Claims, 7 Drawing Sheets

(56) References Cited

U.S. PATENT DOCUMENTS

| | | | |
|---|---|---|---|
| 8,644,361 B2 * | 2/2014 | Ogawa et al. | 375/134 |
| 8,730,898 B2 * | 5/2014 | Kim et al. | 370/329 |
| 2011/0176632 A1 * | 7/2011 | Jeong et al. | 375/267 |
| 2011/0291847 A1 * | 12/2011 | Gilpatrick | 340/657 |
| 2011/0310825 A1 * | 12/2011 | Hu et al. | 370/329 |
| 2012/0099544 A1 * | 4/2012 | Pajukoski et al. | 370/329 |
| 2012/0108254 A1 * | 5/2012 | Kwon et al. | 455/450 |
| 2012/0213191 A1 * | 8/2012 | Park et al. | 370/329 |
| 2012/0213311 A1 * | 8/2012 | Park et al. | 375/295 |
| 2013/0010833 A1 * | 1/2013 | Ogawa et al. | 375/138 |
| 2013/0034011 A1 * | 2/2013 | Yoon et al. | 370/252 |
| 2013/0121266 A1 * | 5/2013 | Ko et al. | 370/329 |
| 2013/0155992 A1 * | 6/2013 | Yoon et al. | 370/329 |
| 2013/0201931 A1 * | 8/2013 | Noh et al. | 370/329 |

OTHER PUBLICATIONS

Panasonic, "OCC and CS for UL DMRS in SU/MU-MIMO", 3GPP Draft: R1-104906, Madrid, Spain, Aug. 23-27, 2010, 5 Pages.

Pantech, "UL-DM-RS enhancements for UL CoMP in Rel-11", 3GPP Draft: R1-113833, San Francisco, USA, Nov. 18, 2011, 5 Pages.

Pantech, "Uplink DM-RS Design in LTE-Advanced", 3GPP Draft: R1-103618, Dresden, Germany, Jun. 28-Jul. 2, 2010, 7 Pages.

3GPP TSG-RAN Meeting #64, Change Request 36.211 CR 0150, R1-111214, Taipei, Taiwan, Feb. 21-25, 2011, 105 pages.

3GPP TSG-RAN Meeting #64, Change Request 36.212 CR CR102, R1-111215, Taipei, Taiwan, Feb. 21-25, 2011, 75 pages.

3GPP TSG-RAN Meeting #64, Change Request 36.213 CR 0273, R1-111216, Taipei, Taiwan, Feb. 21-25, 2011, 113 pages.

* cited by examiner

METHODS AND DEVICES FOR HANDLING REFERENCE SIGNALS IN A COMMUNICATIONS NETWORK

CROSS-REFERENCE TO RELATED APPLICATIONS

This application is a 35 U.S.C. §371 national stage application of PCT International Application No, PCT/SE2012/050736, filed on 28 Jun. 2012, which claims priority to U.S. Provisional Application No. 61/503,093, filed on Jun. 30, 2011. The disclosures of the applications are hereby incorporated herein in their entireties by reference.

TECHNICAL FIELD

Embodiments herein relate generally to a user equipment and a method in the user equipment, and to a base station and a method in the base station. More particularly the embodiments herein relate to handling of reference signals in a communications network.

BACKGROUND

In a typical cellular network, also referred to as a communication system or wireless communication system, User Equipments (UEs), communicate via a Radio Access Network (RAN) to one or more core networks (CNs).

A user equipment is a mobile terminal by which a subscriber may access services offered by an operator's core network and services outside operator's network to which the operator's RAN and CN provide access. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wired or wirelessly in the communications network. The communication may be performed e.g. between two user equipments, between a user equipment and a regular telephone and/or between the user equipment and a server via the radio access network and possibly one or more core networks, comprised within the cellular network.

The communications network covers a geographical area which is divided into cell areas. Each cell area is served by a Base Station (BS), e.g. a Radio Base Station (RBS), which sometimes may be referred to as e.g. "eNB", "eNodeB", "NodeB", "B node", or Base Transceiver Station (BTS), depending on the technology and terminology used. A "cell" is characterized in e.g. Long Term Evolution (LTE) by a "cell-ID", which affects several cell-specific algorithms and procedures.

The base stations may be of different classes such as e.g. macro eNodeB, home eNodeB or pico base station, based on transmission power and thereby also on cell size.

The base station communicates, over radio carriers or channels, with one or more user equipment(s) using a radio access technology, such as e.g. LTE, LTE Advanced, Wideband Code Division Multiple Access (WCDMA), Global System for Mobile Communications (GSM), or any other Third Generation Partnership Project (3GPP) radio access technology. LTE is used as an example in the following description.

When the base station receives, at its antenna(s), signals from a plurality of user equipments, it may use different reception techniques for demodulation. Two different reception techniques for demodulating the symbols from multiple user equipments in each cell are Successive Interference Cancellation (SIC) and Interference Rejection Combining (IRC). Both of these reception techniques require a baseband receiver, at the base station, to estimate the channel between each user equipment and each base station antenna. Baseband refers to signals and systems whose range of frequencies is measured from close to 0 hertz to a cut-off frequency, a maximum bandwidth or highest signal frequency. Baseband may also be used as a noun for a band of frequencies starting close to zero. The quality of the channel estimates greatly influences the performance of both SIC and IRC.

The base station may comprise multiple antennas, and the base station may receive signals from a user terminal at the multiple antennas. To receive a signal from a specific user equipment, the base station determines the set of base station antennas that will be used to receive the signal transmitted from the user equipment. The signals received by this set of antennas are sent to an "uplink receiver" that demodulates the signal transmitted by the user equipment. Note that the same set of antennas could be used for the reception of multiple user equipments. The uplink receiver typically estimates the uplink channels between each user equipment and base station antenna using reference signals that are transmitted from each user equipment on the uplink. When the base station estimates the uplink channel from a particular user equipment, the reference signals from other user equipments in the network act as interference and degrade the accuracy of the channel estimation. Therefore, it is generally desirable that the reference signals from all the user equipments are mutually orthogonal. In an LTE system, given one reference signal spanning consecutive subcarriers, a second orthogonal reference signal spanning the same subcarriers may be generated by adding a linear phase rotation to the same base reference signal. By using different phase rotations for different user equipments, a large number of mutually orthogonal reference signals spanning the same subcarriers may be generated.

The communication between a base station and a user equipment may be structured in different ways, depending on the technology which is used. For example, in LTE, the communication is structured in frames and subframes. One type of LTE frame, i.e. Time Division Duplex (TDD) mode, has an overall length of 10 ms. The frame is divided into 20 individual slots. A subframe comprises two slots, i.e. there are ten subfames within a frame. Another type of an LTE frame, i.e. Frequency Division Duplex (FDD) mode, comprises two half frames, each having an overall length of 5 ms. And each half frame is split into five subframes, each 1 ms long.

An LTE communications network is designed to support user equipments from different releases, i.e., Rel-8/9/10/11, in a backward compatible way. One of the LTE network design objective is to enable co-scheduling of such user equipments in time, frequency and space, i.e. Multi-User Multiple Input Multiple Output (MU-MIMO), dimensions with as few scheduling constraints as possible.

Furthermore, the LTE standard should be able to support various and flexible deployments. Some examples of expected deployments for modern LTE networks, i.e. Rel-11 and beyond, comprise, e.g., Macro-deployments, where large cells are typically divided into independent sectors.

Hetrogenous Networks (HetNet)-deployments, where pico-cells are deployed within the coverage of macro-cell in order, e.g., to improve coverage for high data rate user equipments.

Hotspot scenarios where an access point serves a small area with high throughput need.

In addition, LTE networks are designed with the aim of enabling optional Coordinated Multipoint Processing (CoMP) techniques, where different sectors and/or cells operate in a coordinated way in terms of, e.g., scheduling and/or processing. An example is uplink CoMP where the signal originating from a single user equipment is typically received at multiple reception points and jointly processed in order to improve the link quality. Uplink joint processing, also referred to as uplink CoMP, allows transformation of what is regarded as inter-cell interference in a traditional deployment into a useful signal. Therefore, LTE networks taking advantage of uplink CoMP may be deployed with smaller cell size compared to traditional deployments in order to fully take advantage of the CoMP gains.

The uplink of LTE is designed assuming coherent processing, i.e., the receiver is must be able to estimate the radio channel from a transmitting user equipment and to take advantage of such information in a detection phase, i.e. in demodulation of a received signal. Therefore, each transmitting user sends a Reference Signal (RS) associated to each uplink data channel, i.e. Physical Uplink Shared Channel (PUSCH). The reference signal may also be called pilot signal and are inserted in the transmitted signal. The reference signals are sent fairly often as the channel conditions change due to fast fading and other changes.

Each reference signal is characterized by a group-index and a sequence-index. The reference signal is derived from a base sequence. Cyclic shift may be used for deriving the reference signal from the base sequence. In other words, multiple reference signal sequences are defined from each base sequence.

Base sequences are cell-specific in Rel-8/9/10 and they are a function of the cell-ID. Different base sequences are semi-orthogonal. The reference signal for a given user equipment is only transmitted on the same bandwidth of PUSCH, and the base sequence is correspondingly generated so that the reference signal is a function of the PUSCH bandwidth. For each subframe, two reference signals are transmitted, one per slot.

There are two types of uplink reference signals: a demodulation reference signal and a Sounding Reference Signal (SRS). The demodulation reference signal is used for channel estimation for data demodulation, and the sounding reference signal is used for user scheduling.

Reference signals from different user equipments within the same cell potentially interfere with each other and, assuming synchronized networks, even with reference signals originated by user equipments in neighboring cells. In order to limit the level of interference between reference signals different techniques have been introduced in different LTE releases in order to allow orthogonal or semi-orthogonal reference signals. The design principle of LTE assumes orthogonal reference signals within each cell and semi-orthogonal reference signals among different cells, even though orthogonal reference signals may be achieved for aggregates of cells by so called "sequence planning".

Orthogonal reference signals may be achieved by use of Cyclic Shift (CS) in Rel-8/9 or by CS in conjunction with Orthogonal Cover Codes (OCC) in Rel-10. It is may be assume that CS and OCC may also be supported by Rel-11 user equipments.

Cyclic shift is a method to achieve orthogonality based on cyclic time shifts, under certain propagation conditions, among reference signals generated from the same base sequence. Only eight different cyclic shift values may be indexed in Rel-8/9/10, even though in practice less than eight orthogonal reference signals may be achieved depending on channel propagation properties. Even though cyclic shift is effective in multiplexing reference signals assigned to fully overlapping bandwidths, orthogonality is lost when the bandwidths differ and/or when the interfering user equipments employ another base sequence.

OCC is a multiplexing technique based on orthogonal time domain codes, operating on the two reference signals provided for each uplink subframe. The OCC code [1-1] is able to suppress an interfering reference signal as long as its contribution after the base station matched filter is identical on both reference signals of the same subframe. Similarly, the OCC code [1 1] is able to suppress an interfering reference signal as long as its contribution after the base station matched filter has an opposite sign respectively on the two reference signals of the same subframe. The matched filter will be described in more detail below.

While base sequences are assigned in a semi-static fashion, CS and OCC are user equipment specific and dynamically assigned as part of the scheduling grant for each uplink PUSCH transmission.

Even though joint processing techniques may be applied for PUSCH, channel estimates based on reference signals are typically performed in an independent fashion at each reception point, even in case of uplink CoMP. Therefore, it is crucial to keep the interference level at an acceptably low level, especially for the reference signals.

In order to minimize the impact of burst interference peaks on reference signals, interference randomization techniques have been introduced in LTE. In particular:

Cyclic shift randomization is always enabled and generates random cell-specific cyclic shift offsets per slot. The pseudo-random CS pattern is a function of the base sequence index and the cell-ID and is thus cell-specific.

Sequence hopping and Group Hopping (SGH) are base sequence index randomization techniques which operate on a slot level with a cell-specific pattern, which is a function of the cell-ID and sequence index.

For Rel-8/9 user equipments, SGH may be enabled/disabled on a cell-basis.

For Rel-10 user equipments, SGH may be enabled in a user equipment specific fashion.

In the uplink for LTE Rel-10 multi-antenna techniques which may significantly increase the data rates and reliability of a communication system is introduced. The performance is in particular improved if both the transmitter and the receiver are equipped with multiple antennas. This results in a MIMO communication channel, and such systems and/or related techniques are referred to as MIMO.

LTE Rel.10 supports a spatial multiplexing mode, i.e. Single User-MIMO (SU-MIMO), in the communication from a single user equipment to the base station. SU-MIMO is aimed for high data rates in favorable channel conditions. SU-MIMO comprises the simultaneous transmission of multiple data streams on the same bandwidth, where each data stream is usually termed as a layer. Multi-antenna techniques such as linear precoding are employed at the transmitter in order to differentiate the layers in the spatial domain and allow the recovering of the transmitted data at the receiver side.

Another MIMO technique supported by LTE Rel.10 is MU-MIMO, where multiple UEs belonging to the same cell are completely or partly coscheduled on the same bandwidth and time slots. Each UE in the MU-MIMO configuration may possibly transmit multiple layers, thus operating in SU-MIMO mode.

In case of SU-MIMO it is necessary to allow the receiver to estimate the equivalent channel associated to each transmitted layer of each user equipment in order to allow detection of all the data streams. In case of CoMP, such requirement applies also to user equipments belonging to other cells but comprised in the joint processing cluster. Therefore, each user equipment needs to transmit a unique reference signal at least for each transmitted layer. The base station receiver is aware of which reference signal is associated to each layer and performs estimation of the associated channel by performing a channel estimation algorithm. The estimated channel is then employed by the receiver in the detection process.

In case of MU-MIMO, user equipments may be scheduled on fully or partially overlapping bandwidths. Some typical application cases are exemplified in the following:

MU-MIMO within a cell, fully overlapping bandwidth: in this case the reference signals of the different user equipments may be multiplexed by means of CS and/or OCC. Furthermore, SGH may be enabled without affecting orthogonality.

MU-MIMO within a cell, partly overlapping bandwidth: in this case the reference signals of the different user equipments may be multiplexed by means of OCC only and SGH cannot be enabled for any of the user equipments.

MU-MIMO of user equipments belonging to different cells, e.g., in a CoMP application: in this case the user equipments are typically assigned different base sequences and orthogonality may not be achieved, due to the different CS hopping patterns.

The deployments described above and the extensive use of uplink CoMP require scheduling flexibility and improved channel estimation quality, even for geographically far away user equipments belonging to another cell. Assuming, e.g., a HetNet deployment, the small cell radius of the picocell and the geographic location within the macrocell coverage implies the presence of potentially strong interference between user equipments belonging to such cells. Densifications of the cells, increasing number of receive antennas and optional CoMP processing, on the other hand, emphasizes the need for flexible MU-MIMO scheduling. In the scenarios described above, disabling SGH will enhance the risk of inter-cell interference peaks.

The presence of a user equipment from Rel-8/9/10 and beyond in the same network emphasizes the need to seamlessly co-schedule such user equipments, independently of their specific release. However, MU-MIMO is not efficient in Rel-8/9/10 in conjunction with SGH if the paired user equipments are assigned different base sequences, because neither OCC nor CS are effective in such scenario and only semi-orthogonality may be achieved.

A solution may be to disable SGH in a user equipment specific way for some of the Rel-10 user equipments. However, SGH may only be disabled in a cell-specific way for Rel-8/9 user equipment, implying cell-specific SGH disabling even for Rel-10 user equipments, with severe degradation of inter-cell interference.

Another solution may be to assign the same base sequence, and consequently SGH pattern, to interfering cells such as, e.g., the macrocell and the picocells within the macrocell coverage. However, problems are associated with such a solution such as, e.g., reduced SGH randomization, unpredictably large interference peaks generated when user equipments with the same base sequence are scheduled on partly overlapping bandwidths and DeModulation Reference Sequence (DMRS) capacity limitations, only CS and OCC may be employed for orthogonalizing DMRS over the aggregated cells. Assuming that SGH is enabled, subframes S1 and S2 have different base-sequences on both slots, where s1, s2, s3 and s4 are semi-orthogonal base-sequences pseudo-randomly chosen from a set of predefined base sequences.

Consider, e.g., the case where two user equipments, e.g. UE1 and UE2, are coscheduled on the same bandwidth. Consider the case where UE1 and UE2 belong to different cells and are not assigned the same base sequence. An example is that UE1 belongs to a macro-cell and UE2 to a pico-cell in a hetnet LTE scenario. Assume that the following CS and OCC values are assigned:

UE1: $CS_{1,1}$ on slot-1, $CS\_1,2_2$ on slot-2, OCC1=[1 1]
UE2: $CS_{2,1}$ on slot-1, $CS\_2,2$ on slot-2, OCC2=[1 -1]

$\alpha_{CS_{a,b}}$ is the phase shift corresponding to the CS for user a and slot b, and $\alpha_{CS_{1,1}} - \alpha_{CS_{2,1}} = \alpha_{CS_{1,2}} - \alpha_{CS_{2,2}}$ as typically configured in an LTE network in order to keep the same CS separation in the two slots but randomized CS value per slot.

The signal for the DMRS on slot-1 for UE1 is $x_{1,1}(n)=s_1(n) \otimes \delta(n-T_{1,1})$, The signal for the DMRS on slot-2 for UE1 is $x_{1,2}(n)=s_2(n) \otimes \delta(n-T_{1,2})$, The signal for the DMRS on slot-1 for UE2 is $x_{2,1}(n)=s_3(n) \otimes \delta(n-T_{2,1})$, The signal for the DMRS on slot-2 for UE2 is $x_{2,2}(n)=s_4(n) \otimes \delta(n-T_{2,2})$, where $\otimes$ indicates circular convolution over the support of $s_x(n)$ and $\delta(n)$ is a Dirac's delta centered on sample 0. $T_{a,b}$ represents the delay, in samples, due to the cyclic shift in frequency domain $CS_{a,b}$.

Due to the properties of Constant Amplitude Zero Auto-Correlation (CAZAC) sequences employed for base-sequences, it holds $s_1 \otimes s_1^* = \delta(n)$. CAZAC is a periodic complex-valued signal with modulus one and out-of-phase periodic, i.e. cyclic, autocorrelation equal to zero. CAZAC sequences find application in wireless communication systems, for example in LTE for synchronization of user equipments with base stations.

Let $h_1$ be the channel impulse response from UE1 and let $h_2$ be the channel impulse response from UE2 to the access point. Let the channels be constant over the two slots. Disregarding for simplicity the noise terms, the received signal $y_1$ on slot-1 reads as $$y_1(n) = h_1(n) \otimes x_{1,1}(n) + h_2(n) \otimes x_{2,1}(n),$$

while the signal at slot-2 reads as $$y_2(n) = h_1(n) \otimes x_{1,2}(n) + h_2(n) \otimes x_{2,2}(n).$$

Consider, e.g., the channel estimator for UE1 based on a matched filter. The matched filter may be obtained by correlating a known signal with an unknown signal to detect the presence of the template in the unknown signal. This is equivalent to convolving the unknown signal with a conjugated time-reversed version of the template. The matched filter is the optimal linear filter for maximizing the Signal to Noise Ratio (SNR) in the presence of additive stochastic noise. The output of the matched filter is:

$$g_1(n) = \frac{x_{1,1}(n) * \otimes y_1(n) + x_{1,2}(n) * \otimes y_2(n)}{2}$$

$$= h_1(n) + \frac{h_2(n) \otimes (x_{1,1}(n) * \otimes x_{2,1}(n) - x_{1,1}(n) * \otimes x_{2,2}(n))}{2}$$

-continued $$h_1(n) + \frac{h_2(n) \otimes x_{1,1}(n) * \otimes (x_{2,1}(n) - x_{2,2}(n))}{2}$$

where $$\frac{h_2(n) \otimes x_{1,1}(n) * \otimes (x_{2,1}(n) - x_{2,2}(n))}{2}$$

represents inter-UE interference. i.e. interference between the UE1 and the UE2, and is in general non-zero. Clearly, the above described solution is not able to cancel DMRS interference in the analyzed scenario.

SUMMARY

An objective of embodiments herein is therefore to obviate at least one of the above disadvantages and to provide improved channel estimation in a communications network.

According to a first aspect, the objective is achieved by a method in a first user equipment for handling reference signals in a communications network. The first user equipment is configured to receive a signal from a base station over a radio channel. The signal comprises a first slot and a second slot. The first slot comprises a first reference signal and the second slot comprises a second reference signal. The first user equipment receives, from the base station, information that the first reference signal should be assigned to the second slot and that the second reference signal should be assigned to the first slot. The first user equipment assigns the first reference signal to the second slot, and assigns the second reference signal to the first slot. The first user equipment process the first reference signal assigned to the second slot and the second reference signal assigned to the first slot.

According to a second aspect, the objective is achieved by a method in a base station for handling reference signals in a communications network. The base station is configured to transmit a signal to a first user equipment over a radio channel. The signal comprises a first slot and a second slot. The first slot comprises a first reference signal and the second slot comprises a second reference signal. The base station determines that the first reference signal should be assigned to the second slot and the second reference signal should be assigned to the first slot. The base station sends information to the first user equipment that the first reference signal should be assigned to the second slot and the second reference signal should be assigned to the first slot.

According to a third aspect, the objective is achieved by a first user equipment for handling reference signals in a communications network. The first user equipment comprises a receiving unit configured to receive a signal from a base station over a radio channel. The signal comprises a first slot and a second slot. The first slot comprises a first reference signal and the second slot comprises a second reference signal. The receiving unit is further configured to receive, from the base station, information that the first reference signal should be assigned to the second slot and that the second reference signal should be assigned to the first slot. The first user equipment further comprise a processing unit configured to assign the first reference signal to the second slot; assign the second reference signal to the first slot; and to process the first reference signal assigned to the second slot and the second reference signal assigned to the first slot.

According to a fourth aspect, the objective is achieved by a base station for handling reference signals in a communications network. The base station comprises a transmitting unit configured to transmit a signal to a first user equipment over a radio channel. The signal comprises a first slot and a second slot. The first slot comprises a first reference signal and the second slot comprises a second reference signal. The base station further comprises a determining unit configured to determine that the first reference signal should be assigned to the second slot and the second reference signal should be assigned to the first slot. The transmitting unit is further configured to send information to the first user equipment that the first reference signal should be assigned to the second slot and the second reference signal should be assigned to the first slot.

Since the reference signals are time swapped for the two slots, and the conjugate operation is performed on the swapped reference signals, co-scheduling and perfect reference signal, RS, orthogonality of UE from different releases is accomplished.

Embodiments herein afford many advantages, of which a non-exhaustive list of examples follows:

The embodiments herein provides the advantage of allowing reduced interference on RS compared to prior art by enabling SGH for MU-MIMO. Further, the embodiments herein allow improved scheduling flexibility for MU-MIMO, and it allows MU-MIMO between Rel-11 LTE UEs and UEs from previous LTE releases without disabling SGH.

The implementation complexity of the embodiments herein is marginal and it allows reuse of the SGH sequences implemented in Rel-8/9/10 user equipments.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
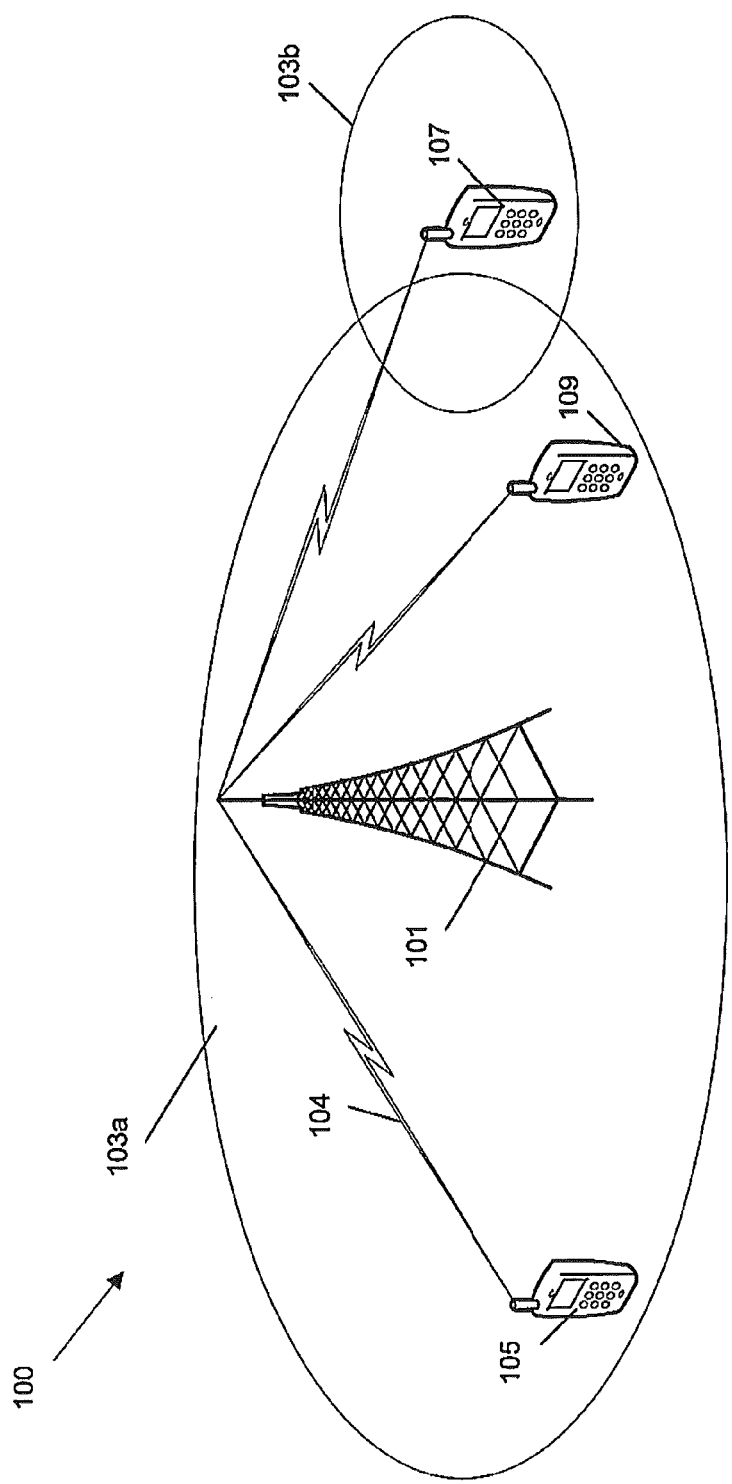
FIG. 1 is a schematic block diagram illustrating embodiments of a communications network.

FIG. 1 depicts a communications network 100 in which embodiments herein relating to optimized signaling of demodulation reference signal patterns may be implemented. The communications network 100 may in some embodiments apply to one or more radio access technologies such as for example LTE, LTE Advanced, WCDMA, GSM, or any other 3GPP radio access technology.

The communications network 100 comprises network nodes such as e.g. a base station 101 serving a first cell 103a. The base station 101 may be a base station such as a Radio Base Station, NodeB, an evolved NodeB (eNB), depending on the technology and terminology used, or any other network unit capable to communicate over a radio carrier 104 with a first user equipment 105 being present in the first cell 103a. The base station 101 may be of different classes, for example a macro base station, such as for example a eNodeB, or a low power base station, such as for example a home eNodeB, pico base station, or femto base station, based on transmission power and thereby also on cell size. The base station 101 may serve one or more cells, such as the first cell 103a and a second cell 103b, which second cell 103 is a neighbor cell to the serving cell 103a. The communications network 100 may further comprise a second user equipment 107 located in the second cell 103b and a third user equipment 109 located in the first cell 103a.

The communications network 100 may be divided into cells, such as e.g. the first cell 103a and the second cell 103b. The use of cells is the reason why a communications network 100 may be referred to as a cellular communications network. A cell is a geographical area where the base station 101 which serves the cell 103a, 103b, provides radio coverage to user equipments present in the cell. A cell 103a, 103b may be of different size such as e.g. a micro cell which typically covers a limited area, a pico cell which typically covers a small area, a femto cell which is typically designed for use in a home or small business or a macrocell which typically provides coverage larger than a microcell.

The first user equipment 105 present within the first cell 103a and served by the base station 101, is in this case capable of communicating with the base station 101 over the radio carrier 104. A data stream(s) is communicated between the base station 101 and the user equipments 105 over the radio channel 104 in a layered approach. Examples of layers are physical layer, data link layer, network layer, transport layer, session layer etc. The radio carrier 104 may also be referred to as carrier, radio channel, channel, communication link, radio link or link. The second user equipment 107 also communicates with the base station 101 over a radio carrier 104, and also the third user equipment 109 communicates with the base station 101 over a radio carrier 104.

The first, second and third user equipment 105, 107, 109 may be any suitable communication devices or computational devices with communication capabilities capable to communicate with the base station 101 over the radio channel 104, for instance but not limited to mobile phone, smart phone, personal digital assistant (PDA), laptop, MP3 player or portable DVD player (or similar media content devices), digital camera, or even stationary devices such as a PC. A PC may also be connected via a mobile station as the end station of the broadcasted/multicasted media. The first, second and third user equipments 105, 107, 109 may be embedded communication devices in e.g. electronic photo frames, cardiac surveillance equipment, intrusion or other surveillance equipment, weather data monitoring systems, vehicle, car or transport communication equipment, etc. The first, second and third user equipments 105, 107, 109 are referred to as UE in some of the figures.

It should be noted that the radio carrier 104 between the base station 101 and the first, second and third user equipments 105, 107, 109 may be of any suitable kind comprising either a wired or wireless link. The carrier 104 may use any suitable protocol depending on type and level of layer, e.g. as indicated by the Open Systems Interconnection (OSI) model, as understood by the person skilled in the art.

The following description uses an UpLink (UL) of an LTE Rel-11 network as an example, even though it may be applied even to the DownLink (DL) and to other communication protocols, such as e.g. the ones mentioned above. The uplink is the link from the user equipment to the base station, and the downlink is the link from the base station to the first user equipment.

The embodiments herein provide a SGH pattern which is obtained by modification of an existing Rel-8/9/10 pattern by means of a time swapping and a conjugate operation of two slots. The pattern allows co-scheduling and perfect reference signal orthogonality of user equipments from different releases of LTE, such as e.g. Rel-11 user equipments together with Rel-8/9/10/11 user equipments. Orthogonality is achieved with the embodiments herein both when SGH is enabled and disabled for the Rel-8/9/10 user equipment. Also, since orthogonality between the first, second and third user equipments 105, 107, 109 is achieved by OCC, all the available CS values may be exploited to multiplex different layers and/or user equipments.

Figure 2:
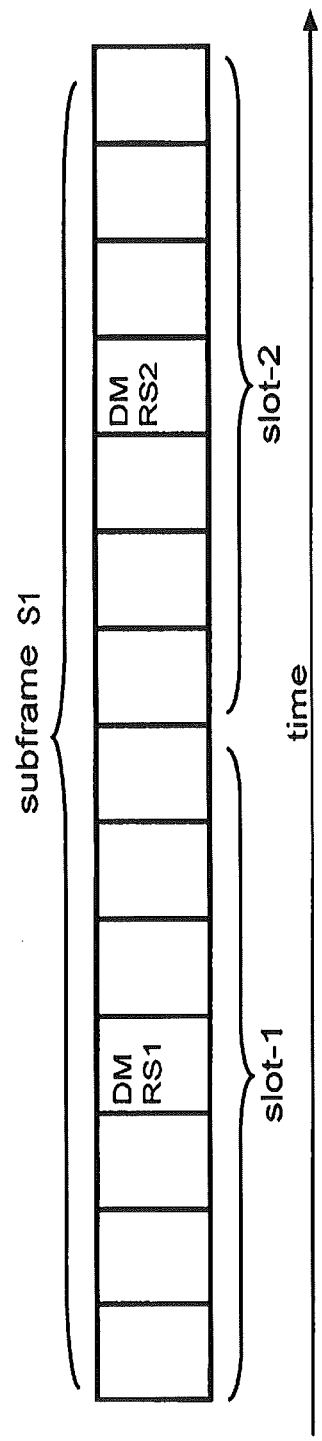
FIG. 2 is a schematic block diagram illustrating embodiments of a UL-DMRS subframe for UE1.

Consider a subframe, S1, transmitted by a first user equipment (UE1) 105 based on LTE Rel-8/9/10 and provided with two DMRS, respectively one per slot, as illustrated in FIG. 2, FIG. 2 represents a single transmission layer for UL-DMRS subframe for the first user equipment 105. DMRS may also be referred to as reference signals (RS). Without loss of generality, in the following a time-domain representation of the signals is provided, but equivalent principles may be applied for frequency-domain processing. The x-axis of FIG. 2 illustrates time in for examples seconds. Let $s_1$ be the DMRS base sequence for slot-1 and $s_2$ the DMRS base sequence for slot-2.

Figure 3:
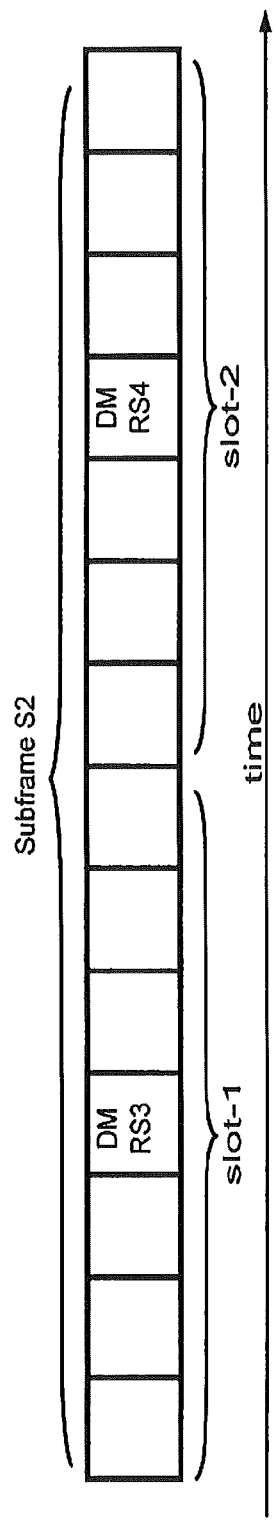
FIG. 3 is a schematic block diagram illustrating embodiments of a UL-DMRS subframe for UE2.

Consider now a second LTE subframe, S2, as illustrated in FIG. 3, where the DMRS base sequences for the two slots are respectively s3 and s4. S2 is transmitted by a second LTE user equipment 107, UE2. FIG. 3 illustrating the uplink DMRS subframe for the second user equipment 107 UE2 has an x-axis representing time, in for examples seconds.

The embodiments herein comprise employing the same base sequences in the same subframe in neighboring cells 103a, 103b, but applying specific processing, e.g., to the DMRS of some of the user equipments so that the interference randomization benefits of SGH are preserved and orthogonality between different cells 103a, 103b is enabled by OCC.

The present embodiments comprises swapping the base sequences and CS for the 2 slots for a subset of the user equipment, e.g., the user equipments 105 belonging to some cells or pico-cells, and applying complex conjugate operations. As it is analytically shown in the following such processing enables DMRS orthogonality even in the presence of SGH.

Consider now the LTE subframe S3 according to the embodiments herein, where the DMRS base sequences for the two slots are respectively s2* and s1*. Consider now the case where the first user equipment 105 UE1 is interfered by the second user equipment 107 UE2 associated to subframe S3.

Assume that the following CS and OCC values are assigned:

UE1: $CS_{1,1}$ on slot-1, $CS_{1,2}$ on slot-2, OCC1=[1 1]
UE2: $CS_{2,1}$ on slot-1, $CS_{2,2}$ on slot-2, OCC2=[1 −1]

$\alpha_{CS_{a,b}}$ is the phase shift corresponding to the CS for user a and slot b, and $\alpha_{CS_{1,1}} - \alpha_{CS_{2,1}} = \alpha_{CS_{1,2}} - \alpha_{CS_{2,2}}$ as typically configured in an LTE network in order to keep the same CS separation in the two slots but randomized CS value per-slot.

The signal for the DMRS on slot-1 for UE1 is $x_{1,1}(n)=s_1(n) \otimes \delta(n-T_{1,1})$, The signal for the DMRS on slot-2 for UE1 is $x_{1,2}(n)=s_2(n) \otimes \delta(T_{1,2})$, The signal for the DMRS on slot-1 for UE2 is $x_{2,1}(n)=s_2(n)^* \otimes \delta(n-T_{2,2})$, The signal for the DMRS on slot-2 for UE2 is $x_{2,2}(n)=-s_1(n)^* \otimes \delta(n-T_{2,1})$, where $\otimes$ indicates circular convolution over the support of $s_x(n)$ and $\delta(n)$ is a Dirac's delta centered on sample 0. $T_{a,b}$ represents the delay, in samples, due to the cyclic shift in frequency domain $CS_{a,b}$. The circular convolution of two aperiodic functions occurs when one of them is convolved in the normal way with a periodic summation of the other function.

The Dirac's delta is a generalized function depending on a real parameter such that it is zero for all values of the parameter except when the parameter is zero, and its integral over the parameter from $-\infty$ to $\infty$ is equal to one.

It should be observed that the CS assigned to the 2 slots of UE2 107 is swapped, so that $CS_{2,2}$ is assigned to slot-1 and $CS_{2,1}$ to slot-2. This feature should be performed jointly with the swapping of the base sequence slots and the conjugate operation.

Consider, e.g., the channel estimator for UE1 105 based on the matched filter. The output of the matched filter is:

$$g_1'(n) = \frac{x_{1,1}(n) * \otimes y_1(n) + x_{1,2}(n) * \otimes y_2(n)}{2}$$

$$= h_1(n) + \frac{h_2(n) \otimes (x_{1,1}(n) * \otimes x_{2,1}(n)) +}{2}$$

$$\frac{h_2(n) \otimes (x_{1,2}(n) * \otimes x_{2,2}(n))}{2}$$

$$= h_1(n) + h_2(n) \otimes \frac{(s_1(n) * \otimes \delta * (n - T_{CS_{1,1}}) \otimes x_{2,1}(n)) +}{2}$$

$$\frac{(s_2(n) * \otimes \delta(n - T_{CS_{1,2}}) \otimes x_{2,2}(n))}{2}$$

$$= h_1(n) + h_2(n) \otimes \frac{(s_1(n) * \otimes \delta(n - T_{CS_{1,1}}) \otimes s_2(n) * \otimes \delta(n - T_{CS_{2,2}})) - (s_2(n) * \otimes \delta(n - T_{CS_{1,2}}) \otimes s_1(n) * \otimes \delta(n - T_{CS_{2,1}}))}{2}$$

$$= h_1(n) + h_2(n) \otimes \frac{(s_1(n) * \otimes s_2(n) * \otimes \delta(n - T_{CS_{1,1}} - T_{CS_{2,2}}) - s_2(n) * \otimes s_1(n) * \otimes \delta(n - T_{CS_{1,2}} - T_{CS_{2,1}}))}{2} =$$

$$h_1(n)$$

where inter-UE interference from S3 is perfectly canceled because $T_{1,1}+T_{2,2}=T_{1,2}+T_{2,1}$.

It should be noted that the channel estimator used for UE1 105 is well known in the art and therefore not further discussed.

It should also be noted that the conjugate operation in time domain corresponds to a vector-flip operation in frequency domain. Flipping a vector comprises flipping a vector a=[1, 2, 3, 4] to b=[4, 3, 2, 1]. It should also be noted that the circular time shift operation in time domain corresponds to a phase shift in frequency domain.

Figure 4:
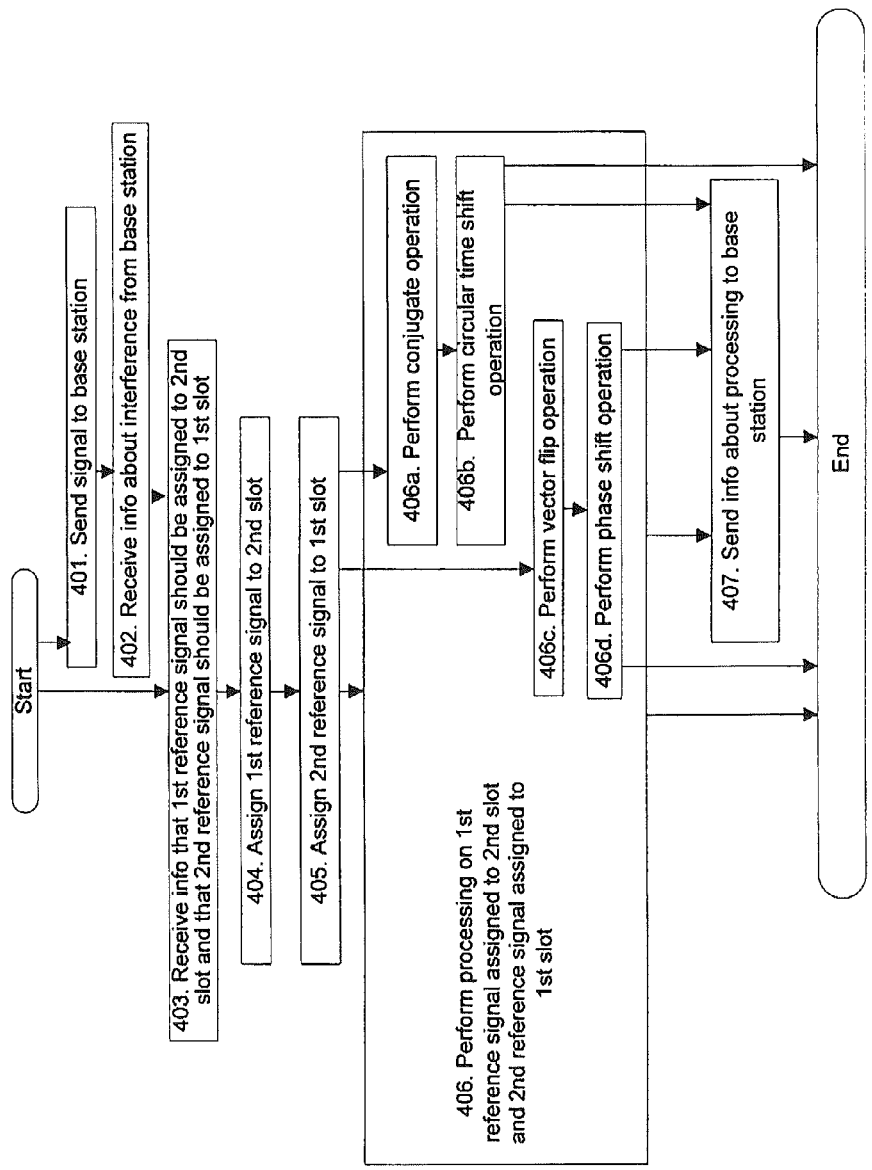
FIG. 4 is a flow chart illustrating embodiments of a method in a user equipment.

The method described above will now be described seen from the perspective of the first user equipment 105. FIG. 4 is a flowchart describing embodiments of a method in the first user equipment 105, for handling reference signals in a communications network 100. As mentioned above, the first user equipment 105 is configured to receive a signal from a base station 101 over a radio channel 104. The signal comprises a first slot and a second slot. The first slot comprises a first reference signal and the second slot comprises a second reference signal. In some embodiments, the first reference signal comprises a first group index and a first sequence index, and the second reference signal comprises a second group index and a second sequence index. In some embodiments, sequence group hopping SGH is enabled in the first user equipment 105. The signal might be received from a base station 101 and transmitted to another base station in a CoMP setting. The reference signals are associated to the first user equipment 105.

Embodiments of the method comprise steps to be performed by the first user equipment 105:

Step 401

In some embodiments, the user equipment 105 sends one or more signal(s) to the base station 101 for detecting interference from a second user equipment 107. The base station may detect the interference based on evaluating the received signal power in relation to it's transmit power, based on error rates of transmitted and received signals and other suitable techniques for detecting or estimating interference known in the art such as by calculating and using reference signal received power RSPR, signal to interference and noise ratio SINR, and the like. Note that also signals received in the base station from the second UE 107 may be used for evaluating the interference situation.

Step 402

In some embodiments, the user equipment 105 receives information about the second user equipment 107 interference from the base station 101. The user equipment 105 may receive the information from the base station via a dedicated message or via the interference information being attached on an existing message, i.e. piggybacked. The receiving of the information of interference from the second user equipment may in some embodiments be an indication that the first reference signal should be assigned to the second slot and that the second reference signal should be assigned to the first slot.

Step 403

In other embodiments, the first user equipment 105 receives, from the base station 101, information that the first reference signal should be assigned to the second slot and that the second reference signal should be assigned to the first slot. In some embodiments, the information further comprises the information about that the first user equipment 105 experiences interference from a second user equipment 107, however the first user equipment 105 does not have to know the reason why the base station 101 sends the instruction to swap the reference signals.

Step 404

The first user equipment 105 assigns the first reference signal to the second slot.

In some embodiments, the base sequence and CS in the first slot is moved to the second slot for the first user equipment 105. AS an example, $CS_{1,1}$ in slot-1 is moved to slot-2.

In some embodiments, the assigning of the first reference signal to the second slot is performed in a time domain or in a frequency domain.

In some embodiments, the first cyclic shift on the first slot is assigned to the second slot so that e.g. $CS_{1,1}$ is assigned to slot-2. This feature may be performed jointly with the swapping of the base sequence slots and a conjugate operation, see step 406 below.

Step 405

The first user equipment 105 assigns the second reference signal to the first slot.

In some embodiments, the base sequence and CS in the second slot is moved to the first slot for the first user equipment 105. $CS_{1,2}$ in slot-2 is moved to slot-1.

In some embodiments, the assigning of the second reference signal to the first slot is performed in a time domain or a frequency domain.

In some embodiments, the second cyclic shift on the second slot is assigned to the first slot so that $CS_{1,2}$ is assigned to slot-1. This feature may be performed jointly with the swapping of the base sequence slots and a conjugate operation, see step 406 below.

Step 406

The first user equipment 105 performs a processing on the first reference signal assigned to the second slot and on the second reference signal assigned to the first slot. In some embodiments the processing on the reference signals comprise that each of the first- and second reference signal respectively is subject to a two step time domain processing or a two step frequency domain processing.

Step 406a

This is a substep of step 406.

In some embodiments, when the processing is performed in a time domain, the first user equipment 105 performs a conjugate operation on the first reference signal assigned to the second slot and on the second reference signal assigned to the first slot.

Step 406b

This is a substep of step 406, and it is a substep performed before or after substep 406a.

In some embodiments, when the processing is performed in the time domain, the first user equipment 105 performs a circular time shift operation on the first reference signal assigned to the second slot and on the second reference signal assigned to the first slot.

Step 406c

This is a substep of step 406, and a substep performed instead of substeps 406a and 406b.

In some embodiments, when the processing is performed in a frequency domain, the first user equipment 105 performs a vector flip operation on the first reference signal assigned to the second slot and on the second reference signal assigned to the first slot.

Step 406d

This is a substep of step 406, and it is a substep performed before or after substep 406c.

In some embodiments, when the processing is performed in the frequency domain, the first user equipment 105 performs a frequency shift operation on the first reference signal assigned to the second slot and on the second reference signal assigned to the first slot.

Figure 5:
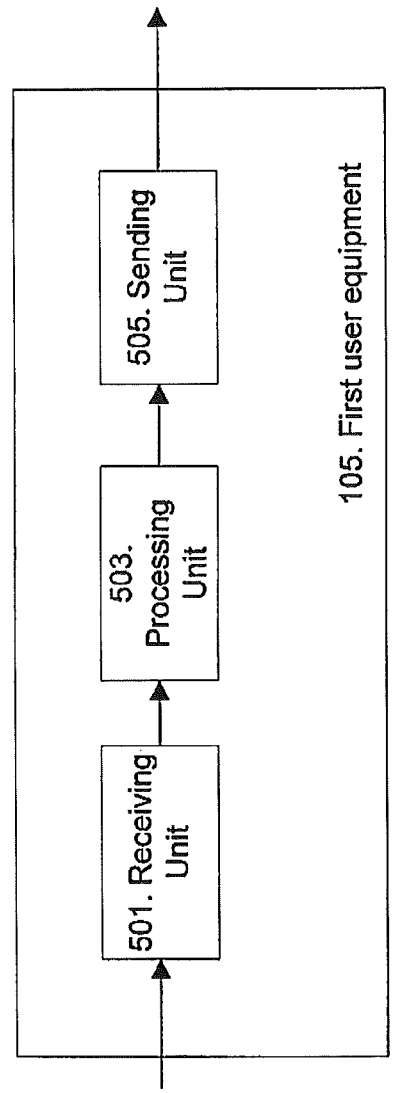
FIG. 5 is a schematic block diagram illustrating embodiments of a user equipment.

To perform embodiments of the method steps shown in FIG. 4 for handling reference signals in a communications network 100, the first user equipment 105 comprises an arrangement as shown in FIG. 5. The first user equipment 105 comprises a receiving unit 501 configured to receive a signal from a base station 101 over a radio channel 104. The signal comprises a first slot and a second slot. The first slot comprises a first reference signal and the second slot comprises a second reference signal. The receiving unit 501 is further configured to receive, from the base station 101, information that the first reference signal should be assigned to the second slot and that the second reference signal should be assigned to the first slot. In some embodiments the first reference signal comprises a first group index and a first sequence index, and the second reference signal comprises a second group index and a second sequence index. In some embodiments, sequence group hopping SGH is enabled in the first user equipment 105. In some embodiments, the receiving unit 501 is further configured to receive, from the base station 101, information that the first user equipment is interfered by a second user equipment 107 as an indication that the first reference signal should be assigned to the second slot and that the second reference signal should be assigned to the first slot.

The first user equipment 105 further comprises a processing unit 503 configured to assign the first reference signal to the second slot, assign the second reference signal to the first slot, and to process the first reference signal assigned to the second slot and the second reference signal assigned to the first slot. In some embodiments, the processing unit 503 is configured to assign the first reference signal to the second slot and to assign the second reference signal to the first slot in a time domain or in a frequency domain.

In some embodiments, the processing unit is configured to operate in a time domain. In some embodiments, the processing unit 503 is further configured to perform a conjugate operation on the first reference signal assigned to the second slot and on the second reference signal assigned to the first slot, and to perform a circular time shift operation on the first reference signal assigned to the second slot and on the second reference signal assigned to the first slot. In some embodiments, the processing unit 503 is configured to operate in a frequency domain. In some embodiments, the processing unit 503 is configured to perform a vector-flip operation on the first reference signal assigned to the second slot and on the second reference signal assigned to the first slot, and to perform a phase shift operation on the first reference signal assigned to the second slot and on the second reference signal assigned to the first slot.

In some embodiments, the user equipment comprises a sending unit 505 configured to send information about the processing to the base station 101. In some embodiments, the sending unit 505 is further configured to send one or more signals to the base station 101 for measuring interference.

Figure 6:
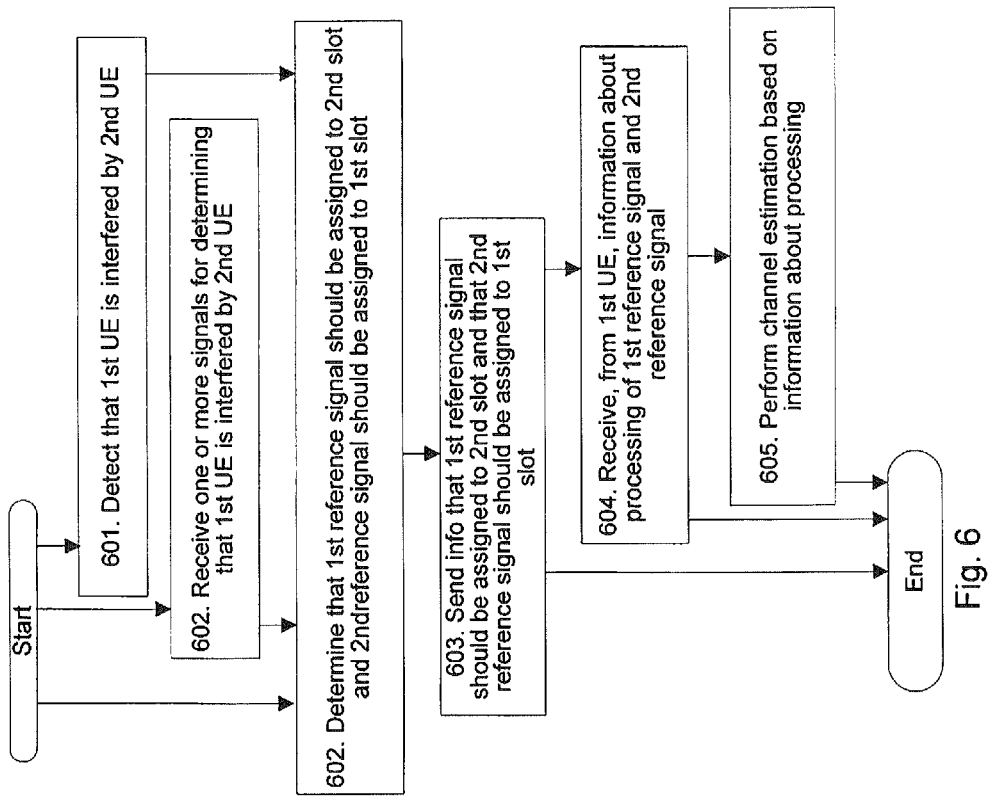
FIG. 6 is a flow chart illustrating embodiments of a method in a base station.

The method described above will now be described seen from the perspective of the base station 101. FIG. 6 is a flowchart describing embodiments of a method in the base station 101, for handling reference signals in a communications network 100. The base station 101 is configured to transmit a signal to a first user equipment 105 over a radio channel 104. The signal comprises a first slot and a second slot. The first slot comprises a first reference signal and the second slot comprises a second reference signal. In some embodiments, the base station 101 is further configured to transmit a signal to a second user equipment 107 over a radio channel 104. The signal comprises a third slot and a fourth slot. The third slot comprises a third reference signal and the fourth slot comprises a fourth reference signal. In some embodiments, the second user equipment 107 interferes with the first user equipment 105. In some embodiments, the first user equipment 105 and the second user equipment 107 are co-scheduled on a same bandwidth. In some embodiments, the first user equipment 105 is located in a first cell 103a, and the second user equipment 107 is located in a second cell 103b. The first cell 103a and second cell 103b are neighbor cells.

Embodiments of the method comprise steps to be performed by the base station 101:

Step 601

In some embodiments, the base station 101 detects or establishes that the first user equipment 105 experiences interference from a second user equipment 107.

Step 602

This is a step performed instead of step 601. In some embodiments, the base station 101 receives, from at least on of the first user equipment 105 and the second user equipment 107, one or more signal(s) which is (are) evaluated for determining that the user equipment 105 experiences interference from a second user equipment 107. The base station may detect or determine the interference based on evaluating the received signal power of one or more the received signal(s) in relation to the signal(s) transmit power, based on error rates of transmitted and received signals and other suitable techniques for detecting or estimating interference known in the art such as through establishing values on reference signal received power RSPR, signal to interference and noise ratio SINR, and the like and/or by comparing such signal related values with thresholds.

Step 603

The base station 101 determines that the first reference signal should be assigned to the second slot and that the second reference signal should be assigned to the first slot. In other words, the base station 101 assigns the swap of the reference signals by downlink control information DCI.

In some embodiments, the base station 101 determines that the first reference signal should be assigned to the second slot and the second reference signal should be assigned to the first slot based on the detected or determined interference.

In some embodiments, the base station 101 determines that the third reference signal should be assigned to the fourth slot and the fourth reference signal should be assigned to the third slot.

Step 604

The base station 101 sends information to the first user equipment 105 that the first reference signal should be assigned to the second slot and the second reference signal should be assigned to the first slot.

In some embodiments, the base station sends information to the first user equipment 105 that the third reference signal should be assigned to the fourth slot and the fourth reference signal should be assigned to the third slot.

Step 605

In some embodiments, the base station 101 receives, from the first user equipment 105, information about a processing of the first reference signal and of the second reference signal. In some embodiments the information about the processing comprise that each reference signal have been processed in one of a two step time domain processing and a two step frequency domain processing.

Step 606

In some embodiments, the base station 101 performs channel estimation based on the information about the processing. Some embodiments comprise that the channel estimation is performed based on either or both of the receiving of information about the processing and the actual information about the processing.

Figure 7:
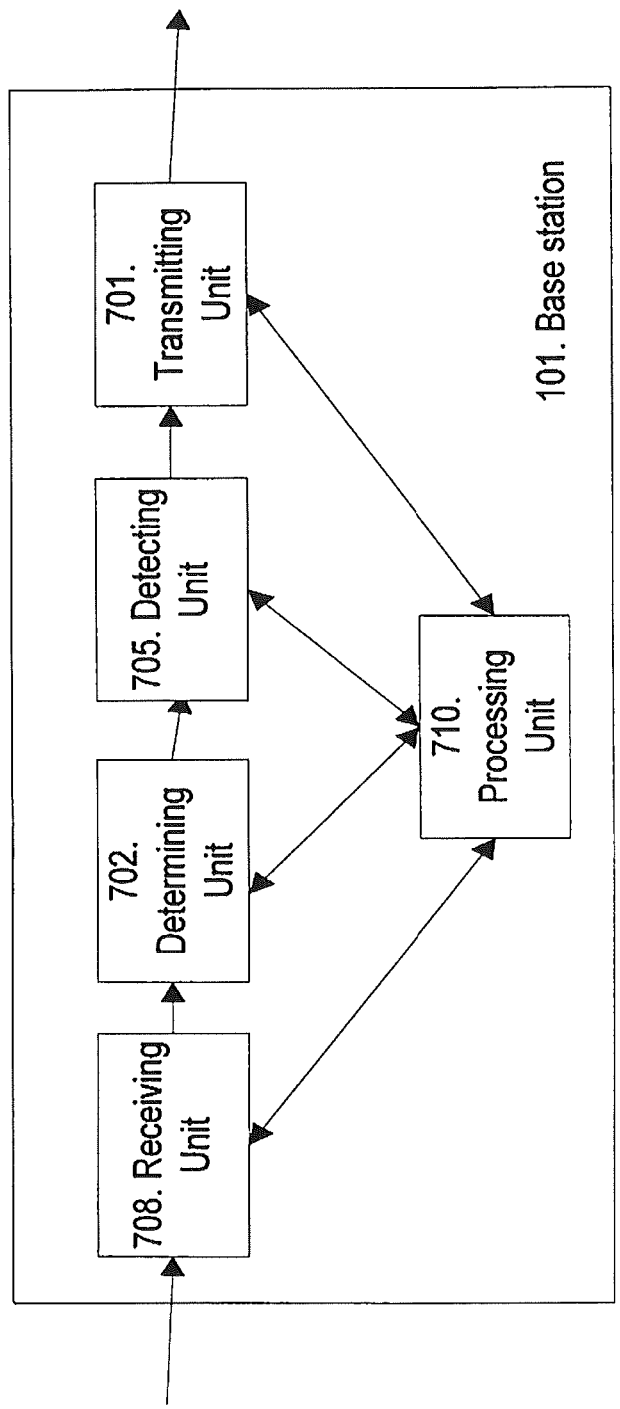
FIG. 7 is a schematic block diagram illustrating embodiments of a base station.

To perform embodiments of the method steps shown in FIG. 6 for handling reference signals in a communications network 100, the base station 101 comprises an arrangement as shown in FIG. 7. The base station 101 comprises a transmitting unit 701 configured to transmit a signal to a first user equipment 105 over a radio channel 104. The signal comprises a first slot and a second slot. The first slot comprises a, first reference signal and the second slot comprises a second reference signal. In some embodiments, the base station 101 is configured to transmit a signal to a second user equipment 107 over a radio channel 104. The signal comprises a third slot and a fourth slot. The third slot comprises a third reference signal and the fourth slot comprises a fourth reference signal. In some embodiments, the second user equipment 107 interferes with the first user equipment 105. In some embodiments, the first user equipment 105 and the second user equipment 107 are cosheduled on a same bandwidth. In some embodiments, the first user equipment 105 is located in a first cell 103a, and the second user equipment 107 is located in a second cell 103b. The first cell 103a and second cell 103b are neighbour cells.

The base station 101 further comprises a determining unit 702 configured to determine that the first reference signal should be assigned to the second slot and the second reference signal should be assigned to the first slot. In some embodiments, the determining unit 702 is further configured to determine that the first reference signal should be assigned to the second slot and the second reference signal should be assigned to the first slot based on the detected interference or based on information about the interference.

The transmitting unit 701 is further configured to send information to the first user equipment 105 that the first reference signal should be assigned to the second slot and the second reference signal should be assigned to the first slot.

In some embodiments, the base station 101 comprises a detecting unit 705 configured to detect that the first user equipment 105 experiences interference from a second user equipment 107.

In some embodiments, the base station 101 comprises a receiving unit 708 configured to receive, from the first user equipment 105, information about that the first user equipment 105 experiences interference from a second user equipment 107. In some embodiments, the receiving unit 708 is further configured to receive, from the first user equipment 105, information about a processing of the first reference signal and the second reference signal.

In some embodiments, the base station 101 comprises a processing unit 710 configured to perform channel estimation based on the information about the processing.

The present mechanism for handling reference signals in a communications network 100 may be implemented through one or more processors, such as a processing unit 503 in the first user equipment 105 depicted in FIG. 5 and a processing unit 710 in the base station 101 depicted in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the user equipment 105 and/or base station 101. One such carrier may be in the form of a CD ROM disc. It is however feasible with other data carriers such as a memory stick. The computer program code may furthermore be provided as pure program code on a server and downloaded to the user equipment 105 and/or base station 101 remotely.

Note that although terminology from 3GPP LTE-Advanced has been used in this disclosure to exemplify the embodiments herein, this should not be seen as limiting the scope of the embodiments herein to only the aforementioned system. Other wireless systems, comprising WCDMA, WiMax, UMB and GSM, may also benefit from exploiting the ideas covered within this disclosure.

Also note that terminology such as base station and UE should be considering non-limiting and does in particular not imply a certain hierarchical relation between the two; in general "base station" could be considered as device 1 and "UE" device 2, and these two devices communicate with each other over some radio channel.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a user equipment for handling reference signals in a communications network, the user equipment being configured to receive a signal from a base station over a radio channel, the signal comprising a first slot and a second slot, the first slot comprising a first reference signal and the second slot comprising a second reference signal, the method comprising:
    receiving, from the base station, information that the first reference signal should be assigned to the second slot and that the second reference signal should be assigned to the first slot;
    assigning the first reference signal to the second slot;
    assigning the second reference signal to the first slot; and
    processing the first reference signal assigned to the second slot and the second reference signal assigned to the first slot by applying to each of the first and second reference signals one of a time domain processing and a frequency domain processing.

2. The method according to claim 1, wherein processing the first reference signal assigned to the second slot and the second reference signal assigned to the first slot comprises applying the time domain processing and further comprises:
    performing a conjugate operation on the first reference signal assigned to the second slot and the second reference signal assigned to the first slot; and
    performing a circular time shift operation on the first reference signal assigned to the second slot and the second reference signal assigned to the first slot.

3. The method according to claim 1, wherein processing the first reference signal assigned to the second slot and the second reference signal assigned to the first slot comprises applying the frequency domain processing and further comprises:
    performing a vector-flip operation on the first reference signal assigned to the second slot and the second reference signal assigned to the first slot; and
    performing a phase shift operation on the first reference signal assigned to the second slot and the second reference signal assigned to the first slot.

4. The method according to claim 1, further comprising sending information about processing the first reference signal assigned to the second slot and the second reference signal assigned to the first slot to the base station.

5. The method according to claim 1, wherein the first reference signal comprises a first group index and a first sequence index, and wherein the second reference signal comprises a second group index and a second sequence index.

6. The method according to claim 1, wherein assigning the first reference signal to the second slot and assigning the second reference signal to the first slot are performed in a time domain or a frequency domain.

7. The method according to claim 1, wherein sequence group hopping (SGH) is enabled in the user equipment.

8. The method according to claim 1, wherein the user equipment comprises a first user equipment, the method further comprising:
    sending one or more signal(s) to the base station for use in detecting interference from a second user equipment; and
    receiving information about the second user equipment interfering with the first user equipment from the base station,
    wherein assigning the first reference signal to the second slot and the second reference signal to the first slot are based on the information about the interference.

9. A method in a base station for handling reference signals in a communications network, the base station being configured to transmit a signal to a user equipment over a radio channel, the signal comprising a first slot and a second slot, the first slot comprising a first reference signal and the second slot comprising a second reference signal, the method comprising:
    determining that the first reference signal should be assigned to the second slot and the second reference signal should be assigned to the first slot; and
    sending information to the user equipment that the first reference signal should be assigned to the second slot and the second reference signal should be assigned to the first slot.

10. The method according to claim 9, wherein the user equipment comprises a first user equipment, the method further comprising:
    detecting that the first user equipment experiences interference from a second user equipment, wherein determining that the first reference signal should be assigned to the second slot and the second reference signal should be assigned to the first slot comprises determining that the first reference signal should be assigned to the second slot and the second reference signal should be assigned to the first slot based on the detected interference.

11. The method according to claim 9, wherein the user equipment comprises a first user equipment, the method further comprising:
    receiving, from the first user equipment, one or more signals that are evaluated for detecting that the first user equipment experiences interference from a second user equipment, wherein determining that the first reference signal should be assigned to the second slot and the second reference signal should be assigned to the first slot comprises determining that the first reference signal should be assigned to the second slot and the second reference signal should be assigned to the first slot based on the detected interference.

12. The method according to claim 9, wherein the user equipment comprises a first user equipment, the method further comprising:
    receiving, from the first user equipment, information about a processing of the first reference signal and of the second reference signal; and
    performing channel estimation based on the information about the processing.

13. The method according to claim 9, wherein:
the user equipment comprises a first user equipment;
the base station is further configured to transmit a signal to a second user equipment over a radio channel;
the signal comprises a third slot and a fourth slot;
the third slot comprises a third reference signal and the fourth slot comprises a fourth reference signal; and
the second user equipment interferes with the first user equipment.

14. The method according to claim 10, wherein the first user equipment and the second user equipment are coscheduled on a same bandwidth.

15. The method according to claim 10, wherein the first user equipment is located in a first cell, wherein the second user equipment is located in a second cell, and wherein the first cell and the second cell are neighbour cells.

16. A user equipment configured to handle reference signals in a communications network, the user equipment comprising:
a receiving unit configured to:
receive a signal from a base station over a radio channel, wherein the signal comprises a first slot and a second slot, and wherein the first slot comprises a first reference signal and the second slot comprises a second reference signal; and
receive, from the base station, information that the first reference signal should be assigned to the second slot and that the second reference signal should be assigned to the first slot,
wherein the user equipment further comprises a processing unit configured to:
assign the first reference signal to the second slot;
assign the second reference signal to the first slot; and
process the first reference signal assigned to the second slot and the second reference signal assigned to the first slot by applying to each of the first and second reference signals one of a time domain processing and a frequency domain processing.

17. A base station configured to handle reference signals in a communications network, the base station comprising:
a transmitting unit configured to transmit a signal to a user equipment over a radio channel, wherein the signal comprises a first slot and a second slot, and wherein the first slot comprises a first reference signal and the second slot comprises a second reference signal; and
a determining unit configured to determine that the first reference signal should be assigned to the second slot and the second reference signal should be assigned to the first slot,
wherein the transmitting unit is further configured to send information to the user equipment that the first reference signal should be assigned to the second slot and the second reference signal should be assigned to the first slot.

* * * * *

UNITED STATES PATENT AND TRADEMARK OFFICE
CERTIFICATE OF CORRECTION

| | | |
|---|---|---|
| PATENT NO. | : 9,100,961 B2 | Page 1 of 1 |
| APPLICATION NO. | : 13/575988 | |
| DATED | : August 4, 2015 | |
| INVENTOR(S) | : Sorrentino | |

It is certified that error appears in the above-identified patent and that said Letters Patent is hereby corrected as shown below:

Specification

In Column 9, Line 17, delete "second cell 103" and insert -- second cell 103b --, therefor.

In Column 14, Line 67, delete "on" and insert -- one --, therefor.

Signed and Sealed this
Twenty-ninth Day of March, 2016

Michelle K. Lee
*Director of the United States Patent and Trademark Office*